(12) United States Patent
Feng et al.

(10) Patent No.: US 8,787,207 B2
(45) Date of Patent: Jul. 22, 2014

(54) TOPOLOGY DISCOVERY OF A PRIVATE NETWORK

(75) Inventors: FuJen Feng, Fremont, CA (US); Ming Chow, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 166 days.

(21) Appl. No.: 13/005,484

(22) Filed: Jan. 12, 2011

(65) Prior Publication Data

US 2011/0141944 A1 Jun. 16, 2011

Related U.S. Application Data

(63) Continuation of application No. 11/355,730, filed on Feb. 15, 2006, now Pat. No. 7,903,585.

(51) Int. Cl.
*H04L 12/28* (2006.01)
(52) U.S. Cl.
USPC .......................................... 370/255; 370/401
(58) Field of Classification Search
None
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,229,988 A | 7/1993 | Marbaker et al. | |
| 5,371,852 A | 12/1994 | Attanasio et al. | |
| 5,473,599 A | 12/1995 | Li et al. | |
| 5,572,528 A | 11/1996 | Shuen | |
| 5,619,552 A | 4/1997 | Karppanen et al. | |
| 5,729,537 A | 3/1998 | Billstrom | |
| 5,793,763 A | 8/1998 | Mayes et al. | |
| 5,825,759 A | 10/1998 | Liu | |
| 5,835,696 A | 11/1998 | Hess | |
| 5,862,345 A | 1/1999 | Okanoue et al. | |
| 5,862,451 A | 1/1999 | Grau et al. | |
| 5,943,604 A | 8/1999 | Chen et al. | |
| 5,987,513 A * | 11/1999 | Prithviraj et al. | ............. 709/223 |
| 6,078,575 A | 6/2000 | Dommety et al. | |
| 6,108,300 A | 8/2000 | Coile et al. | |
| 6,118,784 A | 9/2000 | Tsuchiya et al. | |
| 6,195,705 B1 | 2/2001 | Leung | |

(Continued)

FOREIGN PATENT DOCUMENTS

WO 02073933 11/2002

OTHER PUBLICATIONS

Nordmark, "Stateless IP/ICMP Translation Algorithm (SIIT)", RFC 2765, 26 pages, Feb. 2000.

(Continued)

*Primary Examiner* — Marsha D Banks Harold
*Assistant Examiner* — Hooman Houshmand
(74) *Attorney, Agent, or Firm* — Edwards Wildman Palmer LLP; James M. Behmke; Stephen D. LeBarron

(57) ABSTRACT

The present invention relates to a method and system for determining devices connected to a private network through a gateway. A Network Management System (NMS) through the use of inquiries and Port Address Translation (PAT) commands is able to determine the topology of the network of devices within a private network and thus communicate with them. This is achieved through the use of Port Address Translation (PAT) initiated by the NMS to set a port for each device connected to the gateway.

14 Claims, 5 Drawing Sheets

(56) References Cited

U.S. PATENT DOCUMENTS

| | | | |
|---|---|---|---|
| 6,266,694 B1* | 7/2001 | Duguay et al. | 709/223 |
| 6,331,984 B1 | 12/2001 | Luciani | |
| 6,418,476 B1 | 7/2002 | Luciani | |
| 6,487,605 B1 | 11/2002 | Leung | |
| 6,493,341 B1 | 12/2002 | Datta et al. | |
| 6,512,774 B1 | 1/2003 | Vepa et al. | |
| 6,580,717 B1 | 6/2003 | Higuchi et al. | |
| 6,751,191 B1 | 6/2004 | Kanekar et al. | |
| 6,775,235 B2 | 8/2004 | Datta et al. | |
| 6,779,039 B1 | 8/2004 | Bommareddy et al. | |
| 6,801,949 B1 | 10/2004 | Bruck et al. | |
| 6,839,829 B1 | 1/2005 | Daruwalla | |
| 6,865,184 B2 | 3/2005 | Thubert et al. | |
| 6,885,667 B1 | 4/2005 | Wilson | |
| 7,042,876 B1 | 5/2006 | Jayasenan | |
| 7,047,314 B2 | 5/2006 | Sato et al. | |
| 7,058,007 B1 | 6/2006 | Daruwalla | |
| 7,068,712 B1 | 6/2006 | Zang | |
| 7,227,863 B1 | 6/2007 | Leung | |
| 7,280,557 B1 | 10/2007 | Biswas et al. | |
| 7,474,617 B2* | 1/2009 | Molen et al. | 370/232 |
| 2002/0032761 A1* | 3/2002 | Aoyagi et al. | 709/223 |
| 2002/0068559 A1* | 6/2002 | Sharma et al. | 455/423 |
| 2002/0120697 A1 | 8/2002 | Generous et al. | |
| 2002/0154624 A1 | 10/2002 | Oishi et al. | |
| 2003/0016627 A1* | 1/2003 | MeLampy et al. | 370/235 |
| 2003/0097438 A1* | 5/2003 | Bearden et al. | 709/224 |
| 2003/0110292 A1 | 6/2003 | Takeda et al. | |
| 2003/0131262 A1 | 7/2003 | Goddard | |
| 2003/0140142 A1* | 7/2003 | Marples et al. | 709/225 |
| 2003/0154306 A1* | 8/2003 | Perry | 709/245 |
| 2003/0200463 A1 | 10/2003 | McCabe | |
| 2003/0233576 A1 | 12/2003 | Maufer et al. | |
| 2004/0001509 A1 | 1/2004 | Zhang et al. | |
| 2004/0057385 A1* | 3/2004 | Roshko | 370/252 |
| 2004/0076180 A1* | 4/2004 | Satapati et al. | 370/467 |
| 2004/0103212 A1 | 5/2004 | Takeuchi et al. | |
| 2004/0179508 A1 | 9/2004 | Thubert et al. | |
| 2004/0179532 A1 | 9/2004 | Thubert et al. | |
| 2004/0179536 A1 | 9/2004 | Thubert et al. | |
| 2004/0190549 A1 | 9/2004 | Huitema | |
| 2004/0194088 A1* | 9/2004 | Chen et al. | 718/100 |
| 2004/0233916 A1 | 11/2004 | Takeuchi et al. | |
| 2004/0240468 A1* | 12/2004 | Chin et al. | 370/466 |
| 2005/0010822 A1* | 1/2005 | Zhou et al. | 713/201 |
| 2005/0021702 A1* | 1/2005 | Rangarajan et al. | 709/223 |
| 2005/0053222 A1* | 3/2005 | Lee et al. | 379/219 |
| 2005/0071681 A1* | 3/2005 | Benjamin | 713/201 |
| 2005/0089025 A1 | 4/2005 | Boyer et al. | |
| 2005/0243800 A1 | 11/2005 | Horoschak et al. | |
| 2005/0286553 A1 | 12/2005 | Wetterwald et al. | |
| 2006/0031394 A1 | 2/2006 | Tazuma | |
| 2006/0077988 A1 | 4/2006 | Cheng et al. | |
| 2006/0092931 A1* | 5/2006 | Walter et al. | 370/389 |
| 2006/0101340 A1 | 5/2006 | Sridhar et al. | |
| 2006/0236118 A1 | 10/2006 | Goldberg | |
| 2006/0274741 A1* | 12/2006 | Wing et al. | 370/389 |
| 2006/0280127 A1* | 12/2006 | Mizuno et al. | 370/254 |

OTHER PUBLICATIONS

Hagino et al., "An IPv6-to-IPv4 Transport Relay Translator", RFC 3142, 11 pages, Jun. 2001.

Carpenter et al., "Connecting IPv6 Routing Domains Over the IPv4 Internet", The Internet Protocol Journal, 3:1, Mar. 2000, pp. 1-10.

Tsirtsis et al., "Network Address Translation—Protocol Translation (NAT-PT)", Network Working Group, Request for Comments: 2766, Feb. 2000, pp. 1-21.

Carpenter et al., "Connection of IPv6 Domains via IPv4 Clouds", Network Working Group, Request for Comments: 3056, Feb. 2001, pp. 1-22.

Rekhter et al., "Address Allocation for Private Internets", Network Working Group, Request for Comments: 1918, Feb. 1996.

Srisuresh et al., "IP Network Address Translator (NAT) Terminology and Considerations", Network Working Group, Request for Comments: 2663, Aug. 1999.

Savola, "A View on IPv6 Transition Architecture", Internet Engineering Task Force, Internet Draft, <draft-savola-v6ops-transarch-03.txt>, Jan. 2004, pp. 1-21.

Hain, "Architectural Implications of NAT", Network Working Group, Request for Commetns: 2993, Nov. 2000.

Srisuresh et al., "Traditional IP Network Address Translator (Traditional NAT)", Network Working Group, Request for Comments: 3022, Jan. 2001.

Hinden et al., "Internet Protocol Version 6 (IPv6) Addressing Architecture", Network Working Group, Request for Comments: 3513, Apr. 2003.

Troan et al., "IPv6 Prefix Options for Dynamic Host Configuration Protocol (DHCP) version 6", Network Working Group, Request for Comments: 3633, Dec. 2003.

Deering et al., "Internet Protocol, Version 6 (IPv6) Specification", Network Working Group, Request for Comments: 2460, Dec. 1998.

K. Egevang et al., "The IP Network Address Translator (NAT)", Network Working Group, pp. 1-10, May 1994.

Y. Rekhter et al., "Address Allocation for Private Internets", RFC: 1918, Network Working Group, Feb. 1996.

P. Srisuresh et al. "Load Sharing Using IP Network Address Translation (LSNAT)", RFC: 2391, Network Working Group, Aug. 1998.

E. Gerich, "Guidelines for Management of IP Address Space", RFC: 1466, Network Working Group, May 1993.

J. Moy, "OSPF Version 2", RFC: 1247, Jul. 19, 1991.

D. Oran, "OSI IS-IS Intra-Domain Routing Protocol", RFC: 1142, Feb. 1990.

G. Tsirtsis et al., "Network Address Translation—Protocol Translation (NAT-PT)", RFC: 2766, Feb. 2000.

T. Li et al., Cisco Hot Standby Router Protocol (HSRP), Mar. 1998.

Chambless et al., "Home Agent Redundancy Protocol (HARP)", Oct. 27, 1997.

C. Perkins, "IP Mobility Support", Network Working Group, RFC: 2002, Oct. 1996.

E. Nordmark, "Stateless IP/ICMP Translation Algorithm (SIIT)", RFC: 2765, Online, Feb. 2000.

International Search Report for PCT/US03/32959, dated Mar. 25, 2004.

Carpenter et al., "Connection of IPv6 Domains via IPv4 Clouds", Network Working Group, Request for Comments: 3056, Feb. 2001.

* cited by examiner

TOPOLOGY DISCOVERY OF A PRIVATE NETWORK

CROSS-REFERENCE TO RELATED APPLICATIONS

This application is a continuation of pending U.S. patent application Ser. No. 11/355,730, filed Feb. 15, 2006, the disclosure of which is incorporated herein by reference in its entirety.

FIELD OF THE INVENTION

The present invention relates generally to the discovery of the topology of a private network by a Network Management System (NMS) when the NMS is not directly connected to the private network.

BACKGROUND OF THE INVENTION

Through the use of the Simple Network Management Protocol (SNMP) and other discovery protocols such as Cisco Discovery Protocol (CDP), it is possible for a Network Management System (NMS) to discover the topology of a network. However, there is a limitation in such an approach as the devices in the network cannot be discovered if they are on a private network as defined by RFC 1918 of the Internet Engineering Task Force (IETF).

The present invention addresses the need for a system and method for discovering the devices within a private network by an NMS not contained within the private network.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF EMBODIMENTS OF THE INVENTION

Figure 1:
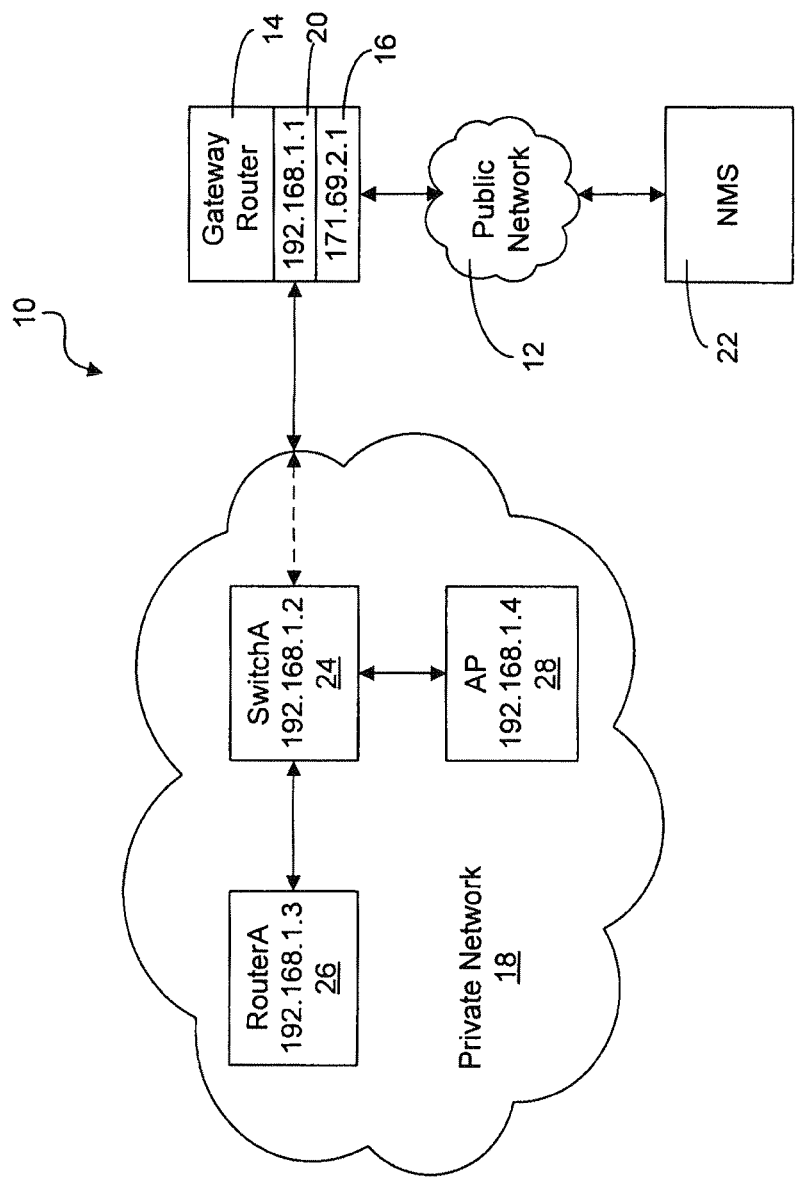
FIG. 1 is a block diagram illustrating an example of a computer network.

For the purpose of describing the prior art means of discovering the topology of a network as well as how an embodiment of the present invention achieves this task we refer first to FIG. 1. FIG. 1 is a block diagram illustrating an example of a computer network and is shown generally as 10.

Network 10 includes a public network 12 connected to a gateway router 14 via an example IP address of 171.69.2.1, shown as feature 16. Gateway router 14 is further connected to a private network 18 via an example IP address of 192.168.1.1, shown as feature 20.

Gateway router 14 acts as a gateway between public network 12 and private network 18. In one embodiment gateway router 14 is a Network Address Translation/Port Address Translation (NAT/PAT) router. NAT/PAT allows a router to rewrite any of the source addresses, destination addresses or ports of IP packets as the pass through the router. Typically this is done to allow devices connected to private network 18 to utilize a single IP address (feature 16) to connect to public network 12. Examples of a private network 18 include a Local Area Network (LAN) and a Wide Area Network (WAN). These private networks 18 are established by an organization that wishes to avoid direct connection between devices in private network 18 and public network 12.

Network Management System (NMS) 22 is connected to public network 12. NMS 22 serves to monitor and provide services to and from the devices connected to public network 12. Part of the function of NMS 22 is to discover and connect to devices through public network 12. By way of example, the devices shown in FIG. 1 are: SwitchA (24), RouterA (26) and Access Point (AP 28). AP 28 is a device that communicates with wireless clients having access to private network 18. As devices 24, 26 and 28 are within private network 18, NMS 22 is unable to discover them.

Figure 2:
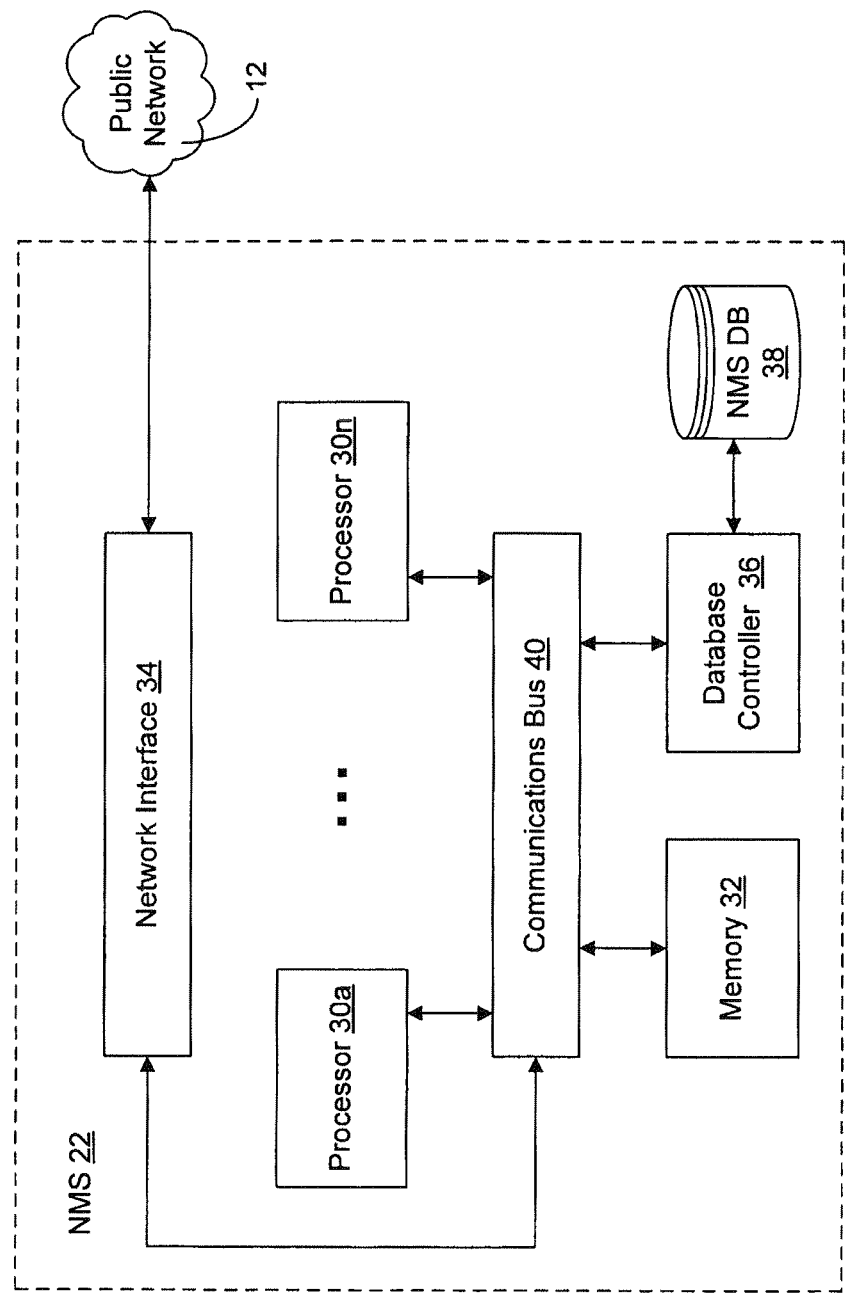
FIG. 2 is a block diagram of an NMS.

We now refer to FIG. 2 a block diagram of an NMS 22. The components of NMS 22 are simply examples of how a generic computing device may be configured to implement NMS 22. NMS 22 comprises one or more processors 30a to 30n. Each processor 30a to 30n is capable of running computing instructions to execute the functions as described with regard to embodiments of the present invention. Memory 32 provides temporary or permanent storage for instructions and data required by processors 30a to 30n. Network interface 34 serves to connect NMS 22 to public network 12 through the use of a communication protocol of choice, an example of which would be TCP/IP or Ethernet. Database controller 36 serves to allow processors 30a to 30n to store and retrieve information regarding private networks 18 and gateway routers 14 to and from NMS database 38. Communications bus 40 allows for communication between the components of NMS 22, namely processors 30a to 30n, memory 32, network interface 34 and database controller 36.

Figure 3:
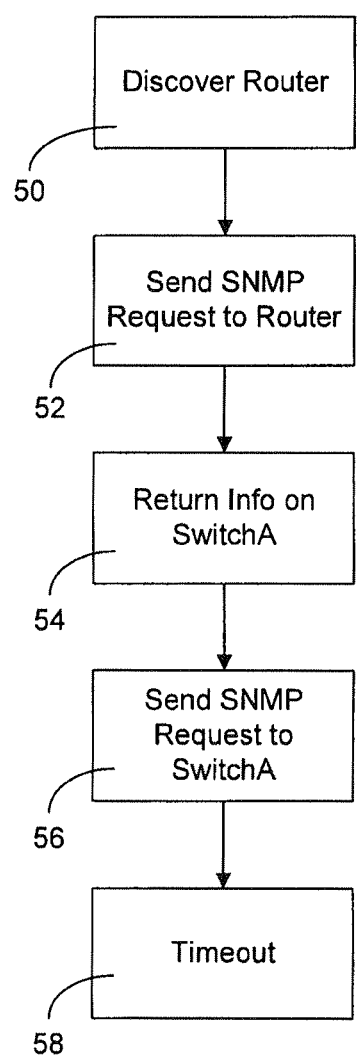
FIG. 3 is a flowchart of a prior art discovery process.

To illustrate the problem of discovering devices within private network 18 by NMS 22 we now refer to FIG. 3, a flowchart of a prior art discovery process.

Beginning at step 50, NMS 22 discovers gateway router 14 with an example IP address of 171.69.2.1 (feature 16 of FIG. 1). At step 52 NMS 22 sends a Simple Network Management Protocol (SNMP) request message to gateway router 14 to obtain information about devices connected to gateway router 14. At step 54 gateway router 14 informs NMS 22 that it is connected to SwitchA 24. At step 56 NMS 22 sends an SNMP request to SwitchA 24 via example IP address 192.168.1.1, to obtain information about devices connected to SwitchA 24. The request sent at step 56 will eventually timeout at step 58 as SwitchA 24 is within private network 18 and as such cannot provide information on RouterA 26 and AP 28.

Figure 4:
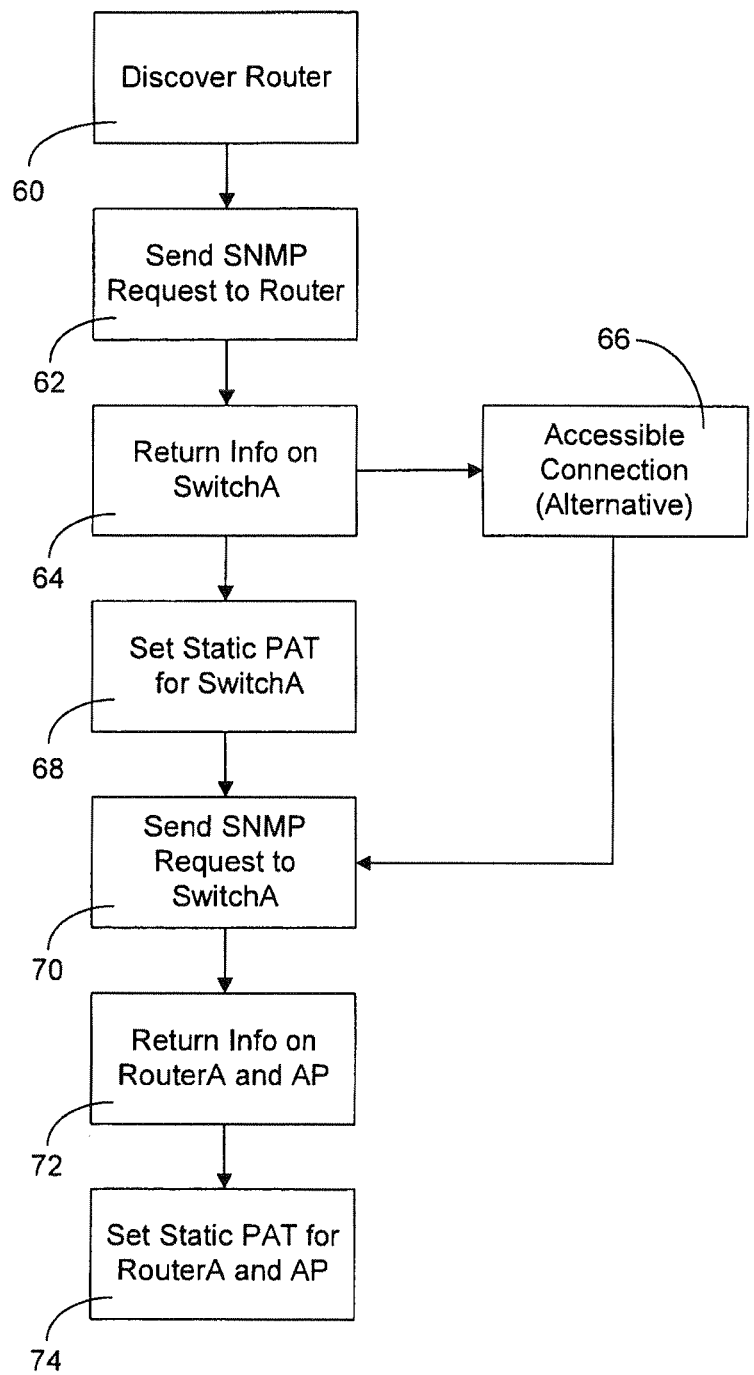
FIG. 4 is a flowchart of an embodiment of a discovery process.

Referring now to FIG. 4 a flowchart of an embodiment of a discovery process as implemented by the present invention is shown.

Beginning at step 60 NMS 22 discovers gateway router 14 with an example IP address of 171.69.2.1. At step 62 NMS 22 sends a Simple Network Management Protocol (SNMP) message to gateway router 14 to obtain information about devices connected to gateway router 14. At step 64 gateway router 14 informs NMS 22 that it is connected to SwitchA 24. From the information returned at step 64 NMS 22 is aware that SwitchA 24 is a private address. At this point processing moves to step 68 but an alternative embodiment may be utilized as shown in step 66. In an alternative embodiment if NMS 22 determines that SwitchA 24 has a private address it may choose to check whether the private address is accessible or not. This can be done by sending a ping or SNMP message to the private address of SwitchA 24. If the private address of SwitchA 24 is reachable, the NMS 22 may chose to communicate directly with SwitchA 24 and avoid step 68 by moving directly to step 70. At step 68 NMS 22 utilizes telnet/ssh to establish a static PAT entry for SwitchA 24 with gateway router 14. This is done via the following example PAT command, this example is specific to Cisco Internetwork Operating System, other manufacturers may use a different syntax.

ip nat inside source static udp 192.168.1.2 161 171.69.2.1 10000

This now permits NMS 22 to reach SwitchA 24 by sending an SNMP request to gateway router 14 (171.69.2.1) port 10000, as shown in step 70.

At step 72 SwitchA 24 returns information on its neighbors RouterA 26 and AP 28 to NMS 22. At step 74 NMS 22 utilizes telnet/ssh to establish static PAT entries for RouterA 26 and AP 28 with gateway router 14. This is done via the following example PAT commands:

ip nat inside source static udp 192.168.1.3 161 171.69.2.1 10001
   ip nat inside source static udp 192.168.1.4 161 171.69.2.1 10002

The steps 64 to 74 are then repeated for RouterA 26 and AP 28 and their neighbors until all devices behind private network 18 are discovered.

The process described with reference to FIG. 4 also allows for the addition of services to the devices connected to private network 18. For example to add ssh services to SwitchA 24, RouterA 26 and AP 28 the following example PAT commands may be used:

ip nat inside source static tcp 192.168.1.2 22 171.69.2.1 20000
   ip nat inside source static tcp 192.168.1.3 22 171.69.2.1 20001
   ip nat inside source static tcp 192.168.1.4 22 171.69.2.1 20002

Similarly to add telenet services to SwitchA 24, RouterA 26 and AP 28 the following example PAT commands may be used:

ip nat inside source static tcp 192.168.1.2 23 171.69.2.1 30000
   ip nat inside source static tcp 192.168.1.3 23 171.69.2.1 30001
   ip nat inside source static tcp 192.168.1.4 23 171.69.2.1 30002

The IP addresses and PAT commands mentioned in this description apply equally to any version of IP, such as IPv4 and IPv6 as defined by the Internet Engineering Task Force (IETF) in RFC numbers 791, 2373 and 2374.

The references to specific IP addresses are meant only as examples of how an embodiment of the present invention may be utilized. The example disclosed uses a gateway router 14 but applies equally to any device that acts as a gateway between public network 12 and private network 18.

Figure 5:
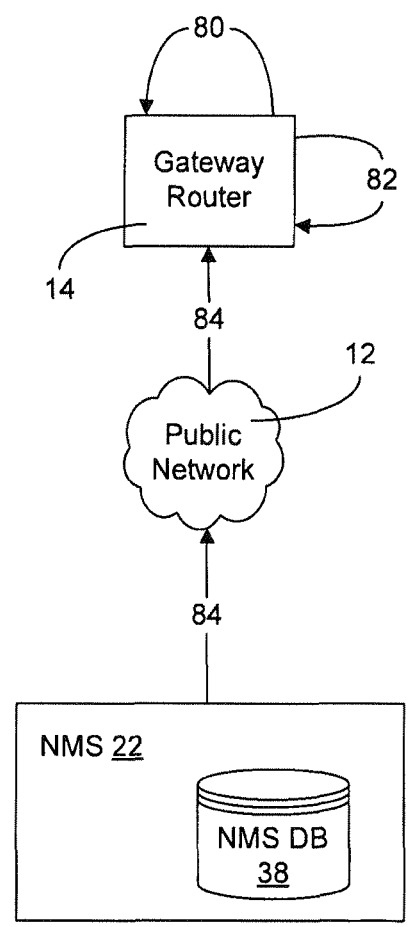
FIG. 5, a block diagram illustrating the logical flow for the mitigation of security risks.

The present invention provides for the opening of ports on a private network 18 to a public network 12. Providing this functionality does provide security risks. These security risks may be mitigated in several ways. We refer now to FIG. 5, a block diagram illustrating the logical flow for the mitigation of security risks. Any of the steps described with reference to FIG. 5 may be implemented individually or in combination.

At step 80 gateway router 14 may set the value of the SNMP community string to a value other than the default of "public". The SNMP community string is a password like string in an SNMP message. When gateway router 14 receives an SNMP message from NMS 22 it will check the community string to determine if it matches the community string configured for gateway router 14. If it does not match, gateway router 14 will ignore the message.

At step 82 gateway router 14 may configure an access control list and a command authorization list. The access control list would only permit access from NMS 22 and the administrators of gateway router 14. The command authorization list would allow only a limited set of commands to be accepted from NMS 22.

At step 84, NMS 22 removes PAT entries on gateway router 14 after discovery of the devices in private network 18. NMS 22 utilizes NMS database 38 to map the discovered device to its PAT entry.

Another issue to consider in implementing the present invention is the selection of an unused port number to configure a PAT on gateway router 14 for NMS 22 to access devices within private network 18. The inventors propose three methods for doing this. In the first method NMS 22 defines an infrequently used port range for PAT to reduce the collision of ports. For example, a port range of 50,000 to 59,999. This method does not eliminate the collision of ports but does mitigate the possibility. In the second method when NMS 22 is configuring a PAT on gateway router 14 it can examine the NAT/PAT translation table maintained by gateway router 14. By examining the table NMS 22 can select a port from a range which is not in use. However, this requires transfer of the table from gateway router 14 to NMS 22 which consumes network and processor time. Further another process may bind to the port eventually selected while the transfer and examination of the table is being made. The third method is the most robust. In this embodiment a secondary public IP address is configured to the public interface 16 of gateway router 14. This secondary address is solely for the use of NMS 22 to configure PAT. When NMS 22 discovers that gateway router 14 has configured this second address by any number of means, for example by parsing the configuration of gateway router 14, it will use the secondary address and an unassigned number from an infrequently used port range to configure PAT. Since this secondary address will be used only by NMS 22 there are no port collision issues.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving, by a network interface, a discovery request from a Network Management System (NMS), wherein the discovery request includes a request to identify a first device of a private network, and wherein the NMS is not part of the private network;
   identifying, by a processor, the first device;
   transmitting, by the network interface, a first private IP address for the first device to the NMS;
   waiting, by the network interface, to receive an access request from the NMS to add a first Port Address Translation (PAT) entry for the first device;
   receiving, by the network interface, the access request from the NMS to add the first Port Address Translation (PAT) entry for the first device, wherein the access request includes the first private IP address and designates a first port for communication with the first device;
   receiving, by the network interface, a second discovery request from the NMS to identify a second device of the private network known by the first device;

identifying, by the processor, the second device;
waiting, by the network interface, to receive a second access request to add a second PAT entry for the second device;
receiving, by the network interface, the second access request to add the second PAT entry for the second device, wherein the access request includes a second private IP address and designates a second port for communication with the second device;
adding, by the processor, the first PAT entry and the second PAT entry to a translation table, wherein the first PAT entry and the second PAT entry include respective the first private IP address and the second private IP address and respective the first designated port and the second designated port;
communicating, by the network interface, the translation table to the NMS; and
removing, by the processor, the PAT entries.

2. The method of claim 1, wherein the first and second access requests are accompanied by a password, and further comprising verifying, by the processor, the passwords prior to adding the first and second PAT entries to a translation table.

3. The method of claim 1, further comprising searching an access control list or a command authorization list, or combinations thereof upon receipt of the discovery request from the NMS.

4. The method of claim 3, further comprising permitting access only to NMS identified in the access control list or authorized administrators of the gateway device or combinations thereof.

5. The method of claim 4, further comprising permitting commands from the NMS only if the commands are listed in the command authorization list.

6. The method of claim 1, further comprising comparing a first community string value with a second community string value, wherein the second community string value is received in the discovery request.

7. The method of claim 6, further comprising ignoring the discover request when the first community string value and the second community string value do not match.

8. An apparatus, comprising:
a network interface; and
one or more processors, wherein the one or more processors are configured to:
receive, via the network interface, a discovery request from a Network Management System (NMS), wherein the discovery request includes a request to identify a first device of a private network, and wherein the NMS is not part of the private network;
identify the first device;
transmit, via the network interface, a first private IP address for the first device to the NMS;
wait to receive an access request from the NMS to add a first Port Address Translation (PAT) entry for the first device;
receive, via the network interface, the access request from the NMS to add the first Port Address Translation (PAT) entry for the first device, wherein the access request includes the first private IP address and designates a first port for communication with the first device;
receive, via the network interface, a second discovery request from the NMS to identify a second device of the private network known by the first device;
identify the second device;
wait to receive a second access request to add a second PAT entry for the second device;
receive, via the network interface, the second access request to add the second PAT entry for the second device, wherein the access request includes a second private IP address and designates a second port for communication with the second device;
add the first PAT entry and the second PAT entry to a translation table, wherein the first PAT entry and the second PAT entry include respective the first private IP address and the second private IP address and respective the first designated port and the second designated port;
communicate, via the network interface, the translation table to the NMS; and
remove the PAT entries.

9. The apparatus of claim 8, wherein the first and second access requests are accompanied by a password, and wherein the one or more processors are further configured to verify the passwords prior to adding the first and second PAT entries to a translation table.

10. The apparatus of claim 8, wherein the one or more processors are further configured to search an access control list or a command authorization list, or combinations thereof upon receipt of the discovery request from the NMS.

11. The apparatus of claim 10, wherein the one or more processors are further configured to permit access only to NMS identified in the access control list or authorized administrators of the gateway device or combinations thereof.

12. The apparatus of claim 11, wherein the one or more processors are further configured to permit commands from the NMS only if the commands are listed in the command authorization list.

13. The apparatus of claim 8, wherein the one or more processors are further configured to compare a first community string value with a second community string value, wherein the second community string value is received in the discovery request.

14. The apparatus of claim 13, wherein the one or more processors are further configured to ignore the discover request when the first community string value and the second community string value do not match.

* * * * *